US007820980B2

(12) United States Patent
Balogh

(10) Patent No.: US 7,820,980 B2
(45) Date of Patent: Oct. 26, 2010

(54) HIGH SPEED COMBINATION MULTI-MODE IONIZATION SOURCE FOR MASS SPECTROMETERS

(75) Inventor: Michael P. Balogh, Rehoboth, MA (US)

(73) Assignee: Waters Technologies Corporation, Milford, MA (US)

(*) Notice: Subject to any disclaimer, the term of this patent is extended or adjusted under 35 U.S.C. 154(b) by 473 days.

(21) Appl. No.: 11/888,914

(22) Filed: Aug. 1, 2007

(65) Prior Publication Data

US 2009/0008569 A1 Jan. 8, 2009

Related U.S. Application Data

(63) Continuation of application No. 10/514,079, filed on Nov. 11, 2004, now abandoned, which is a continuation of application No. PCT/US03/16892, filed on May 30, 2003.

(60) Provisional application No. 60/385,419, filed on May 31, 2002.

(51) Int. Cl.
*G01N 21/01* (2006.01)
*G01N 21/51* (2006.01)
*G01N 23/10* (2006.01)
*G01N 23/12* (2006.01)

(52) U.S. Cl. ....................... 250/424; 250/282; 250/283; 250/286; 250/287; 250/288; 250/423 R

(58) Field of Classification Search ....................... None
See application file for complete search history.

(56) References Cited

U.S. PATENT DOCUMENTS 4,377,745 A * 3/1983 Chang ........................ 250/283

(Continued)

FOREIGN PATENT DOCUMENTS

EP 0 123 552 2/1988

(Continued)

OTHER PUBLICATIONS

UK Examination Report dated Apr. 22, 2005.

(Continued)

*Primary Examiner*—David A Vanore
(74) *Attorney, Agent, or Firm*—Edwards Angell Palmer & Dodge LLP; Peter C. Lauro, Esq.; George N. Chaclas, Esq.

(57) ABSTRACT

The present invention combines ionization modes produced by, for example, electrospray (ESI), atmospheric pressure chemical ionization (APCI), and thermospray for analysis of molecules. Specifically, this invention relates to the creation of a new source apparatus combining APCI and ESI which will interface with existing mass spectrometers, as well as the creation of new mass spectrometers where the present invention would be the ionization source. Furthermore, the present invention relates to an ionization source for a mass spectrometer which features an ion chamber defining an ion path, an electrospray probe for ionizing a sample using electrospray ionization, a corona discharge needle for ionizing a sample using atmospheric pressure chemical ionization, a power supply for applying an electrical potential to one of said electrospray probe and said corona discharge needle, and a solid state switch for directing the electrical potential from the power supply to one of the electrospray probe and said corona discharge needle.

17 Claims, 18 Drawing Sheets

U.S. PATENT DOCUMENTS

| | | | | |
|---|---|---|---|---|
| 4,861,988 | A | 8/1989 | Henion | |
| 4,977,320 | A | 12/1990 | Chowdhury et al. | |
| 5,015,845 | A | 5/1991 | Allen et al. | |
| 5,103,093 | A | 4/1992 | Sakairi et al. | |
| 5,171,990 | A | 12/1992 | Mylchreest et al. | |
| 5,352,892 | A | 10/1994 | Mordehai et al. | |
| 5,668,370 | A | 9/1997 | Yano et al. | |
| 5,736,741 | A * | 4/1998 | Bertsch et al. | 250/288 |
| 5,750,988 | A | 5/1998 | Apffel et al. | |
| 5,753,910 | A * | 5/1998 | Gourley et al. | 250/288 |
| 5,756,994 | A | 5/1998 | Bajic | |
| 5,808,308 | A * | 9/1998 | Holkeboer | 250/423 R |
| 6,207,954 | B1 * | 3/2001 | Andrien et al. | 250/288 |
| 6,236,042 | B1 * | 5/2001 | Kato et al. | 250/288 |
| 6,294,779 | B1 | 9/2001 | Apffel et al. | |
| 6,403,953 | B2 | 6/2002 | Whitehouse et al. | |
| 6,407,382 | B1 * | 6/2002 | Spangler | 250/286 |
| 6,534,765 | B1 | 3/2003 | Robb et al. | |
| 6,573,494 | B1 * | 6/2003 | Andrien et al. | 250/288 |
| 6,583,407 | B1 * | 6/2003 | Fischer et al. | 250/288 |
| 6,586,731 | B1 | 7/2003 | Jolliffe | |
| 6,593,568 | B1 * | 7/2003 | Whitehouse et al. | 250/288 |
| 6,646,256 | B2 * | 11/2003 | Gourley et al. | 250/288 |
| 6,646,257 | B1 * | 11/2003 | Fischer et al. | 250/288 |
| 6,683,302 | B1 | 1/2004 | Eriksson et al. | |
| 6,797,946 | B2 * | 9/2004 | Apffel et al. | 250/288 |
| 7,015,466 | B2 | 3/2006 | Takats et al. | |
| 7,022,981 | B2 | 4/2006 | Kato et al. | |
| 7,034,291 | B1 | 4/2006 | Fischer et al. | |
| 7,449,683 | B2 * | 11/2008 | Shvartsburg et al. | 250/287 |
| 2006/0237663 | A1 * | 10/2006 | Balogh | 250/424 |
| 2009/0008569 | A1 * | 1/2009 | Balogh | 250/424 |

FOREIGN PATENT DOCUMENTS

| | | | |
|---|---|---|---|
| GB | 2 183 902 | A | 6/1987 |
| GB | 2 349 270 | A | 10/2000 |
| JP | 8-236064 | | 9/1996 |
| WO | WO-99/13492 | | 3/1999 |

OTHER PUBLICATIONS

Seigel et al, J. AM. Soc. Mass Spectrom. 1998, pp. 1196-1203.
Lee, Henion, Rapid Commun. in Mass Spectrom. 1992, vol. 6 pp. 727-733.
Yamashit & Fenn, J. Phys Chem., 1984.
Kambara et al, Mass Spectroscopy (Japan) 1976 vol. 24 (3) pp. 229-236.
Horning, Carroll et al, Adv. in Mass Spectrom. Biochem. Medicine, 1976 vol. 1 pp. 1-16.
Carroll, Dzidic et al, Anal. Chem. 1975 vol. 47 (14) pp. 2369-2373.
McKeown, Siegel, American Lab. Nov. 1975 pp. 82-99.
Bruins et al., (34th Ann. Confr. on Mass Spectrometry and Allied Topics, Cincinnati, 1986, pp. 585-586.
Balogh, “A case for congruent multiple ionization modes in atmospheric pressure ionization mass spectrometry”; Journal of Chromatography Library, vol. 72, pp. 65-87.
Castoro, “Investigation of a Simultaneous ESII/APCI Source for LC/MS Analysis”; Proceedings of the 50th ASMS Conference on Mass Spectrometry and Allied Topics, Orlando, FL, Jun. 2-6, 2002.
Office Action in U.S. Appl. No. 10/470,648 dated Jul. 16, 2007.
Office Action in U.S. Appl. No. 10/514,079 dated Feb. 1, 2007.
Office Action in U.S. Appl. No. 10/514,098 dated May 22, 2006.
Office Action in U.S. Appl. No. 10/514,098 dated Aug. 30, 2007.
Robb, et al, “Atmospheric Pressure Photoionization: An Ionization Method for Liquid Chromatography—Mass Spectrometry”; Anal. Chem. 2000, 72, pp. 3653-3659.

* cited by examiner

400

HIGH SPEED COMBINATION MULTI-MODE IONIZATION SOURCE FOR MASS SPECTROMETERS

RELATED APPLICATIONS

This application is a continuation of U.S. patent application Ser. No. 10/514,079, filed Nov. 11, 2004, now abandoned, which is a continuation of international application No. PCT/US03/016892, filed May 30, 2003 designating the United States and published in English on Dec. 11, 2003 as international publication No. WO 03/102537 A2, which claims priority to U.S. Provisional Application No. 60/385,419, filed on May 31, 2002, the entire contents of which are incorporated herein by reference.

FIELD OF THE INVENTION

This invention relates generally to combining ionization modes produced by, for example, electro spray (ESI), atmospheric pressure chemical ionization (APCI), and thermospray for analysis of molecules. In particular, this invention relates to the creation of a new source apparatus combining APCI and ESI which will interface with existing mass spectrometers, as well as the creation of new mass spectrometers where the present invention would be the ionization source. Examples of applications which will benefit from this invention include creation of fast and accurate sample characterization of pharmaceuticals, organic intermediates, as well as the creation of sample libraries produced from combinational chemistry and high throughput biological screening.

BACKGROUND OF THE INVENTION

Mass spectrometry is an analytical methodology used for qualitative and quantitative chemical analysis of material and mixtures of materials. An analyte, usually an organic, inorganic, biomolecular or biological sample, is broken into electrically charged particles of its constituent parts in an ion source. Next, the analyte particles are separated by the spectrometer based on their respective mass-to-Charge ratios. The separated particles are then detected and a mass spectrum of the material is produced. The mass spectrum is analogous to a fingerprint of the sample material being analyzed by providing information about the masses and quantities of various analyte ions that make up the sample. Mass spectrometry can be used, for example, to determine the molecular weights of molecules and molecular fragments within an analyte. In addition, mass spectrometry can be used to identify molecular structures, sub-structures, and components of the analyte based on the fragmentation pattern, which occurs, when the analyte is broken into particles. Mass spectrometry is an effective analytic tool in chemistry, biology, material science, and a number of related fields.

Many challenges remain in building a mass spectrometer having high sensitivity, high resolution, high mass accuracy, and efficient sample use. One challenge is to efficiently maximize the ionization of a sample as well as allow a dynamic range of analyte samples to be used.

Problems have occurred with various ionization methods creating identifiable differences in mass spectra. For example, the introduction of various solution chemistries during the use of Liquid Chromatography/Mass Spectrometry (LC/MS) can cause notable differences in the mass spectra because one or more ions can exist simultaneously in the mass spectrometer source. During electrospray, the liquid is introduced through a metal capillary which carries an extremely high voltage. This environment creates an electrochemistry cell since the resulting spray or plume or jet is a result of the liquid exceeding its rayleigh limits as it is drawn towards a counterelectrode. Also, the redox reaction occurring during electrospray produces identifiable differences in the mass spectra such as the adduction of metal ions, M+Na. There are several different methods of ionization which have been developed.

Ion sources include methods such as APCI, ESI, and thermospray. Generally, APCI derives ions by heating the liquid flow and creating an aerosol. It is worth noting that APCI does not exhibit such adduction as described above, but will promote background ionization since it 'uses' the solvent as a vehicle to transfer charge to the analyte of interest. For example, hydronium ions are created in a plasma through which the analyte travels to become ionized and often tell-tale products such as $M+NH_4$ are created if the liquid contains ammonium acetate. ESI creates the aerosol or plume as a product of the excessive charge. Also related to APCI is thermospray. In general, thermospray is APCI without high voltage (HV) and no APCI needle. (See MDS Parma ASMS poster, 2000). In this method, ions escape the aerosol droplets as they are desolvated.

Of these sources, electrospray sources are amongst the most successful. Although the basic technique of electrospray was known much earlier, the first practical source designs suitable for organic mass spectrometry appeared in 1984 (see e.g., EP 0123552A). Various improvements to this basic electrospray ion source have been proposed. Bruins et ah, (34th Ann. Confr. on Mass Spectrometry and Allied Topics, Cincinnati, 1986, pp 585-6) and (U.S. Pat. No. 4,861,988) describes a pneumatically assisted electrospray source wherein a coaxial nebulizer fed with an inert gas is used in place of the capillary tube of the basic source to assist in the formation of the aerosol. In practice however, sources of this type are often operated with the capillary tube inclined at an angle to the optical axis of the mass analyzer, usually at about 30°, but still directed towards the orifice. U.S. Pat. No. 5,015,845 discloses an additional heated desolvation stage which operates at a pressure of 0.1-10 torr and is located downstream of the first nozzle. While U.S. Pat. Nos. 5,103,093, 4,977,320 and Lee, Henion, Rapid Commun. in Mass Spectrum. 1992, vol. 6 pp. 727-733, and others, teach the use of a heated inlet capillary tube. Furthermore, U.S. Pat. No. 5,171,990 teaches an off-axis alignment of the transfer capillary tube and the nozzle-skimmer system to reduce the number of fast ions and neutrals entering the mass analyzer, and U.S. Pat. No. 5,352,892 discloses a liquid shield arrangement which minimizes the entry of liquid droplets entering the mass analyzer vacuum system.

It has been realized that a major factor in the success of electrospray ionization sources for high-molecular weight samples is that, in contrast with most other ion sources, ionization takes place at atmospheric pressure. Furthermore, ionic and polar compounds ionize by ESI while neutral and weakly-polar compounds typically do not. For this reason, there has been a revival of interest in APCI sources which are also capable of generating stable ions characteristic of high molecular weight, typically <1000 Da, thermally-labile species. Such sources are generally similar to electrospray sources except for the ionization mode.

APCI provides a unique method of ionization by a corona discharge (see Yamashit & Fenn, J Phys Chem., 1984), APCI maintains a corona pin at high potential, allowing the APCI to provide a source of electrons, for example, a beta-emitter, typically a Ni foil, or a corona discharge (see McKeown, Siegel, American Lab. Nov. 1975 pp. 82-99, and Horning, Carroll et al, Adv. in Mass Spectrom. Biochem. Medicine, 1976 vol. 1 pp. 1-16; Carroll, Dzidic et al, Anal. Chem. 1975 vol. 47(14) pp. 2369). In early sources, the high-pressure ionization region was separated from the high vacuum region containing the mass analyzer by a diaphragm containing a very small orifice disposed on the optical axis of the analyzer. Later APCI sources developed into incorporating a nozzle-skimmer separator system in place of the diaphragm (see e.g., Kambara et al., Mass Spectroscopy (Japan) 1976 vol. 24 (3) pp. 229-236 and GB patent application 2183902 A).

Atmospheric pressure ionization sources, in particular electrospray and atmospheric pressure chemical ionization, interfaced with mass spectrometers have become widely used for the analysis of compounds. Ion sources which ionize a sample at atmospheric pressure rather than at high vacuum are particularly successful in producing intact thermally labile high-molecular weight ions.

Previous attempts have been described that create a dual ESI/APCI ionization source. In particular, the dual source ionization relies on a switching box. This modification allows a user to use a control box and two input BNC (bayonet Neill Concelman) connectors of the instrument to either manually or automatically select the voltage for the ESI and APCI modes. Operation of the dual ESI/APCI requires the adjustment of source voltage. Both the ESI and the APCI modes function simultaneously. The most significant parameter controlling the behavior of the source is the temperature and flow rate of the gas (see Seigel et al, J. AM. Soc. Mass Spectrom. 1998, 1196-1203).

SUMMARY OF THE INVENTION

The present invention is based, at least in part, on the discovery that a solid state switch can be used for directing the electrical potential from a power supply to either an electrospray probe or the corona discharge needle(s) creating a multi-mode ionization source. The multi-mode ionization source provides significant advantages over prior ionization sources and techniques. The multi-mode ionization source enables automatic, rapid switching from a first ionization mode to a second ionization mode without compromising results and without requiring modification of the equipment. High-speed switching is provided by the use of a solid-state switching device. Furthermore, due to source design, there is no need to elevate the temperature of the nebulizing gas to effect ionization; the source is capable of rapid switching between techniques without waiting for heating to occur. The multi-mode ionization source allows for optimal techniques and conditions to be applied to a sample during a single run. Thus, the multi-mode ionization source realizes significant savings in cost and time while increasing efficiency.

In one embodiment of the invention, an ionization source for a mass spectrometer contains an ion chamber defining an ion path, an electrospray probe for ionizing a sample, and a corona discharge needle for ionizing a sample using atmospheric pressure chemical ionization. The present invention uses a power supply for applying an electrical potential to the electrospray probe or the corona discharge needle that is run by a solid state switch for directing the electrical potential from the power supply.

Further disclosed by the present invention is a method of ionizing a sample for analysis by a mass spectrometer. This method may include introducing a sample to a probe; ionizing the sample using a first ionization mode; and then switching to a second ionization mode. In one embodiment the ionization of the sample has a duration of less than one tenth (0.1) of a second. Furthermore, switching or interscan delay can be faster or slower depending on desired speed or fidelity.

Also taught by the present invention is a system for ionizing a sample using a multi-mode ionization source. This method may include computer implemented steps such as obtaining information related to the multi-mode ionization source, and ionizing a sample based on the information related to the multi-mode ionization source. A further embodiment of this invention is a system for ionizing a sample using a multi-mode ionization source using a computer. In yet another embodiment, a multi-mode ionization source uses a plurality of ionization modes, and may have an interface for displaying information related to die multi-mode ionization source.

Also taught by the present invention is a computer readable medium for allowing, for example, a user to ionize a sample for analysis by a mass spectrometer using a plurality of different ionization modes utilizing instructions, for running a multi-mode ionization source in response to information entered into a graphical user interface.

Examples of practical applications which will benefit from this invention include creation of fast and accurate sample characterization of pharmaceuticals, organic intermediates, as well as sample libraries produced from combinational chemistry and high throughput biological screening.

BRIEF DESCRIPTION OF THE DRAWINGS

FIG. 2B depicts the chamber defining the ion path.

DETAILED DESCRIPTION OF THE INVENTION

Figure 1:
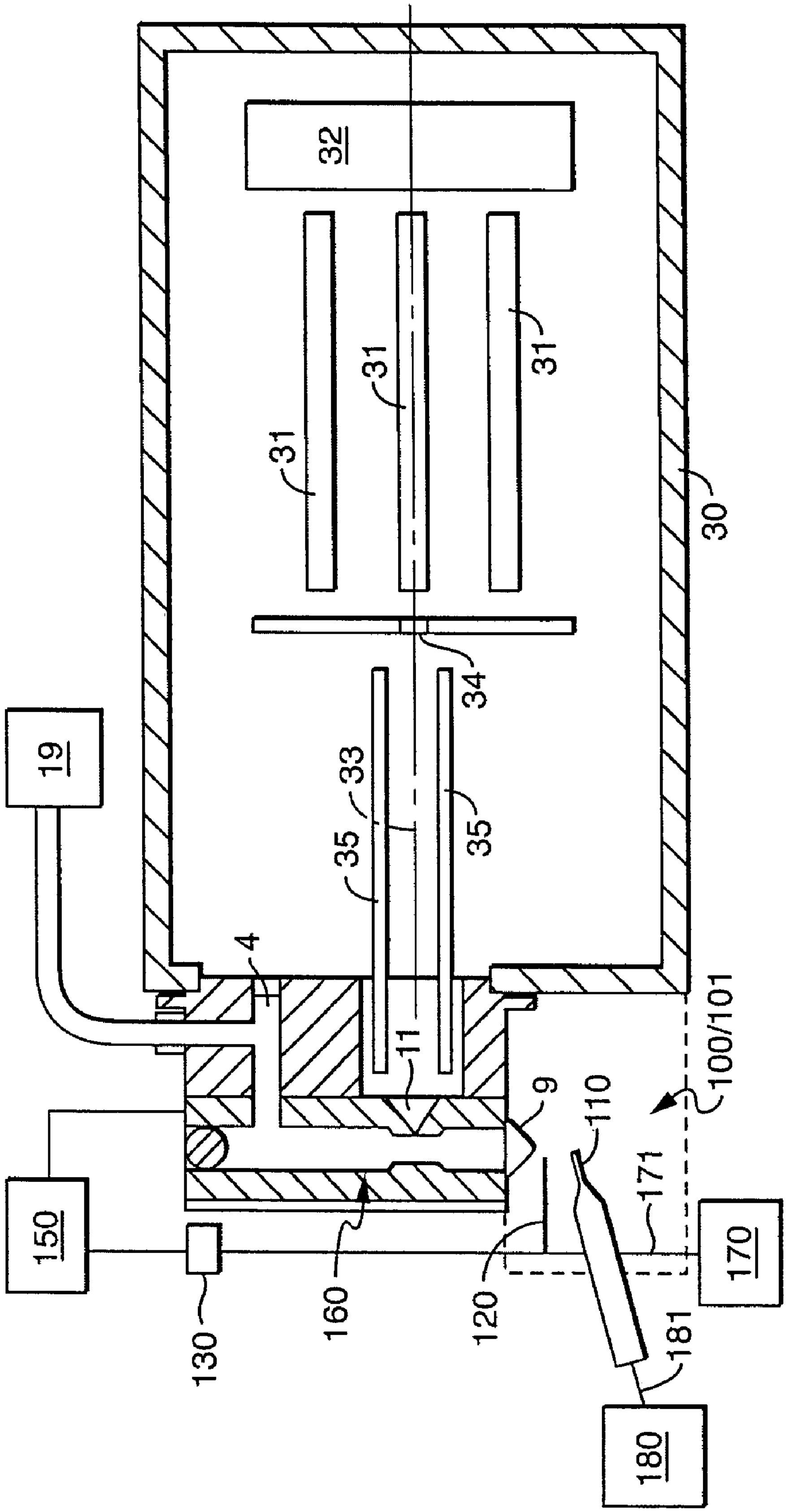
FIG. 1 depicts a schematic drawing of a mass spectrometer suitable for implementing an illustrative embodiment of the present invention.

The present invention provides a multi-mode ionization source for ionizing samples for analysis via mass spectrometry. FIG. 1 is a schematic drawing of a mass spectrometer 10 suitable for implementing an illustrative embodiment of the invention. The mass spectrometer 10 comprises a multi-mode ionization source 100 for producing ions at or near atmospheric pressure and delivering the ions to a vacuum enclosure 30, where they are accelerated and focused into a mass analyzer. The mass analyzer then differentiates the ions according to their mass-to-charge ratio for detection. The ionization source is fitted to the vacuum enclosure, which encloses a quadrupole mass filter 31 and an ion detector 32 for measuring the ion beam current. An electrostatic hexapole lens 35 is also provided and positioned between the ionization source 100 and the entrance aperture 34 of the mass analyzer to increase die efficiency of transmission ions from the ionization source 100. These components are conventional and are shown only schematically in FIG. 1. Other conventional components necessary for the proper operation of the mass filter and detector have been omitted from the figures for the sake of clarity. The mass spectrometer or analyzer can be of several types such as a quadruple, mass magnetic mass, TOF (time of flight), Fourier transform, or other suitable type of mass analyzer known in the art.

The multi-mode ionization source 100 allows different ionization techniques to be applied to a sample, within a single analysis. The multi-mode ionization source 100 combines the ability to generate ions in different modes of ionization into a single source and is capable of switching quickly between, two or more ionization modes without modifying the equipment and without requiring external heating of the nebulizing gas used to assist formation of charged droplets. In one particular embodiment, the multi-mode ionization temperature ranged from 60-70 C.°. The multi-mode ionization source 100 provides a transition time between modes on the order of milliseconds, while providing accurate results. This provides the advantage of providing quality results under a broad range of speed and fidelity interscope delay conditions.

Figure 2A:
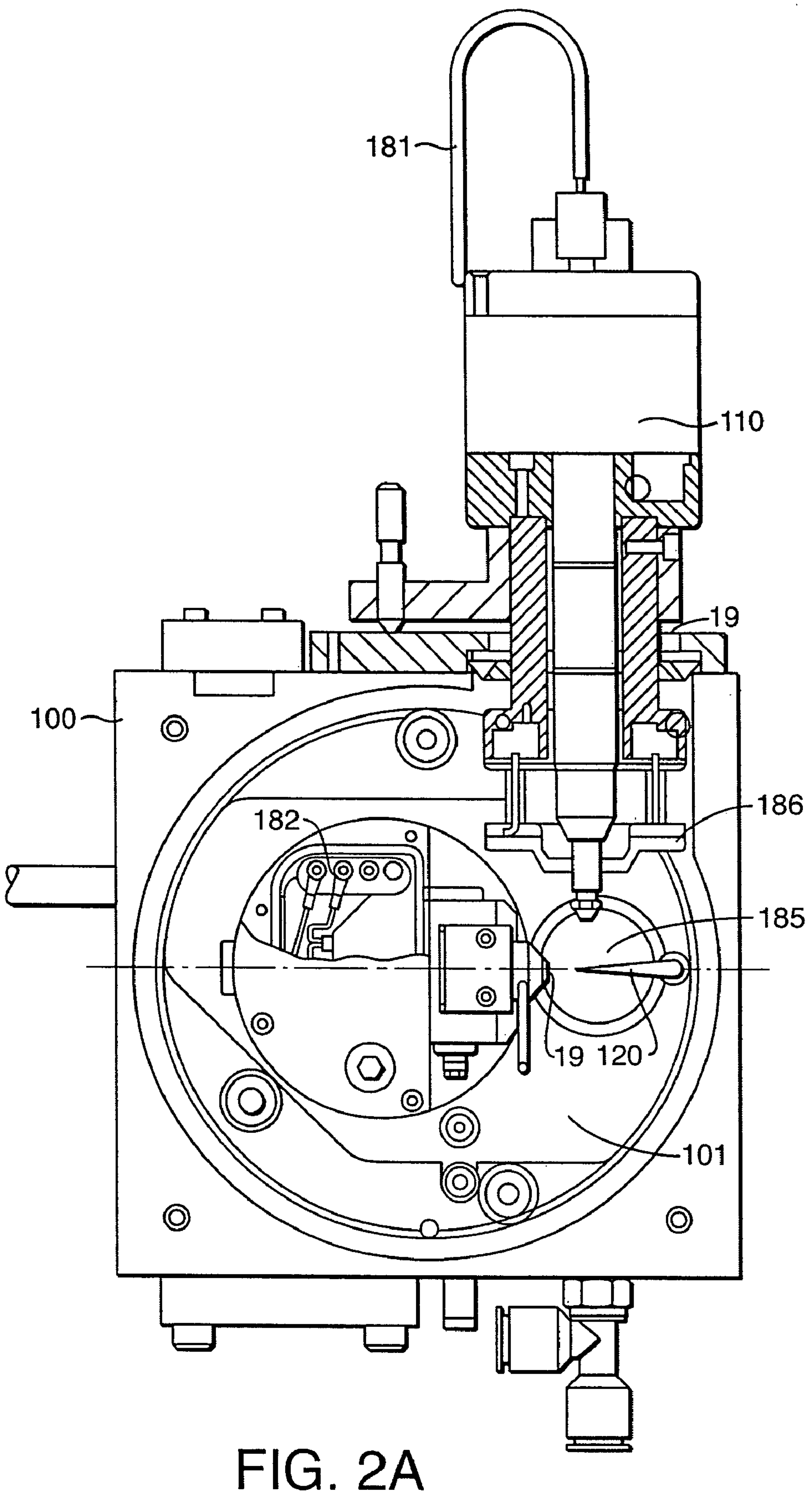
FIG. 2A-2C depict views of the multi-mode ionization source according to illustrative embodiments of the invention.
Figure 2B:
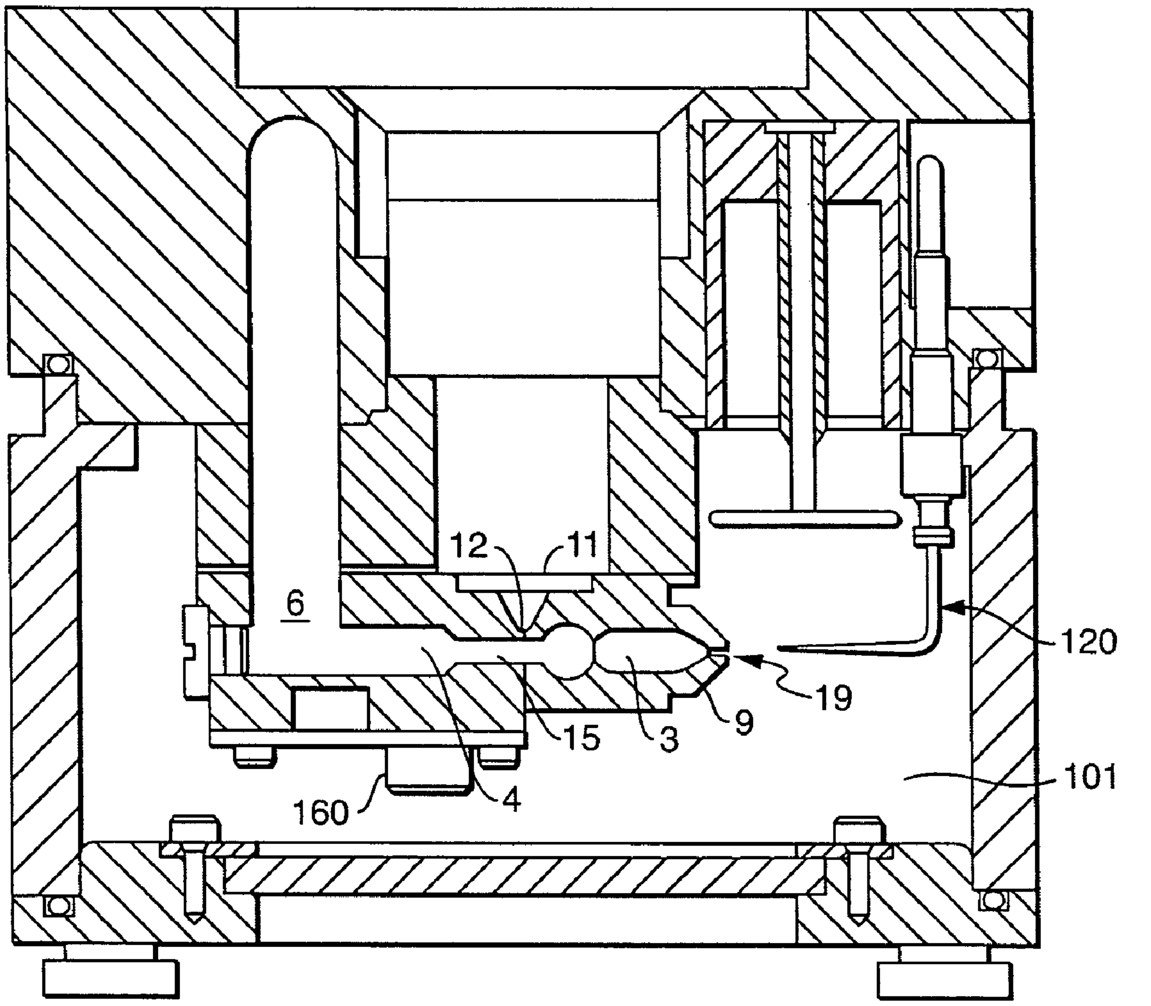
Figure 2C:
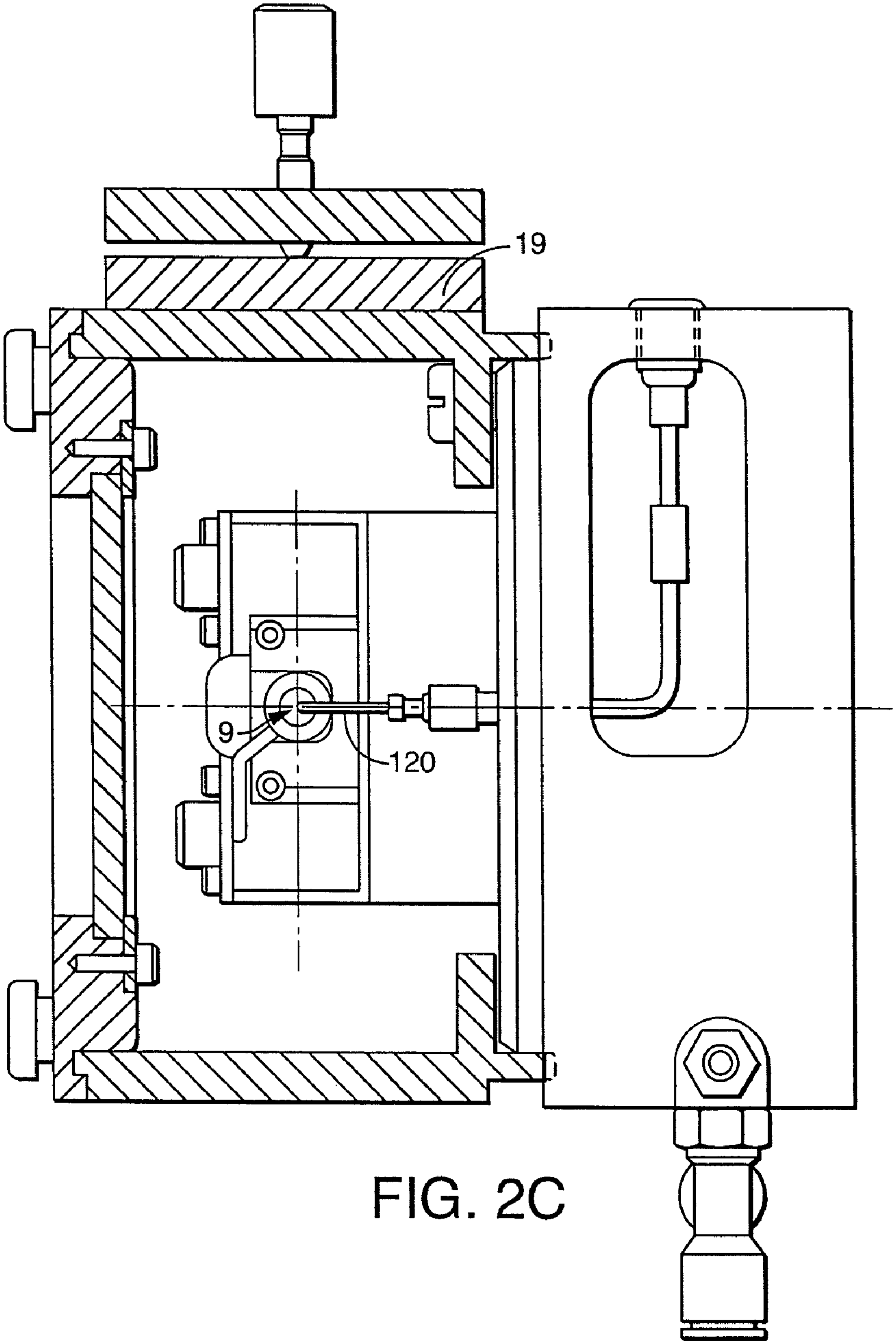

FIGS. 2*a*, 2*b* and 2*c* show a multi-mode ionization source according to an illustrative embodiment of the invention. The illustrative source 100 is a combined APCI-ESI source to enable the source to alternate between APCI and ESI scans (in both positive and negative modes). One skilled in the art will recognize that alternate ionization modes, e.g. photoionization, may be implemented in addition to or in place of the APCI mode or the ESI mode. The multi-mode ionization source interfaces to the mass analyzer to produce ions from continuously flowing liquid samples. The multi-mode ionization source 100 includes a source chamber 101 defining a region of atmospheric pressure, enclosing an electrospray probe 110 to provide electrospray ionization of molecules, a corona discharge needle 120, forming a sharply pointed discharge electrode, to provide atmospheric pressure chemical ionization of molecules and an ion inlet port 19 to a chamber 160. The chamber 160 defines an ion path for conveying ions to the mass analyzer. The source 100 is connected to a power supply 130 (shown in FIG. 1) for generating and applying an electric potential to the electrospray probe 110, the corona discharge needle 120 or both. The power supply 130 includes a solid state switch 150 to enable the source to readily switch between different ionization modes and polarities. The multi-mode source 100 further includes a supply of nebulizing gas 170 (shown in FIG. 1) to assist in the formation of charged droplets and a sample source 180, such as a liquid chromatography column, for providing a sample to be ionized. The introduction of a sample by flowrates of liquid chromotograph system can range from 1 n/L to 10 mL/min. In certain embodiments, the present invention can included a liquid chromatography system which introduces a sample by flow injection at a flow rate between about 50 uL/min to 2 mL/min, and more preferably between about 50 uL/min 1000 uL/min.

A liquid inlet line 181 is provided, which connects the sample source to the ESI probe 110 to deliver the sample to be analyzed to the ESI probe 110. The ion source further includes a plurality source block heaters 182 for heating the ionization region, as well as a probe heater 186. A source exhaust port 185 is also formed in the source chamber 101. The source further includes a diffusion baffle 115 formed around the outlet end of the electrospray probe 110 for directing the flow of vaporized sample from the probe to the ion chamber inlet 19.

As shown in FIG. 2*b*, the chamber 160 defining the ion path includes an entrance chamber 3, an evacuation port 4 and a smaller diameter extraction chamber 15 connecting the entrance chamber 3 and the evacuation port 4. The evacuation port 4 is connected to a vacuum or other suitable evacuation means, such as a mechanical vacuum pump of about 30 $m^3$/hour capacity, through a passage 6. The vacuum maintains the pressure in the extraction chamber 15 less than 100 mm Hg, and typically in the range 1-10 mm Hg. An entrance port 19 to the entrance chamber 3 is formed by an entrance cone 9 having an orifice of a diameter between about 0.4 and about 1.0 mm formed in its apex. The entrance port forms an ion inlet to allow ions to pass from the source chamber 101 to the chamber 160. An exit port 11 preferably comprises a hollow conical member 12 mounted in a recess, which is electrically insulated from the body of the chamber 160. The conical member 12 has an aperture in its apex through which ions formed in the ionization process may pass from the extraction chamber 15 to the mass analyzer.

The chamber 160 may be configured similar to the ionization path of the source described in U.S. Pat. No. 5,756,994, the contents of which are herein incorporated by reference, though the invention is not limited to the illustrated chamber. One skilled in the art will recognize that the chamber for conveying ions to the mass analyzer may have any suitable size and configuration according to the teachings of the present invention allowing for post-aerosol desolvation effects as taught by the presently claimed invention.

In ESI mode, the switch 150 connects the power supply 130 to the ESI probe, so that the power supply applies a high voltage to the ESI probe 110 to effect ionization of molecules, to be described in detail below. In APCI mode, the switch 150 connects the power supply 130 to the corona discharge needle, such that the power supply applies a high voltage to the corona discharge needle 120 to effect ionization of molecules, to be described below. A data system, such as the MassLynx™ system, enables automatic switching between the different modes and polarities. Control signals from the data system further select and control the techniques and parameters of operation.

Figure 3:
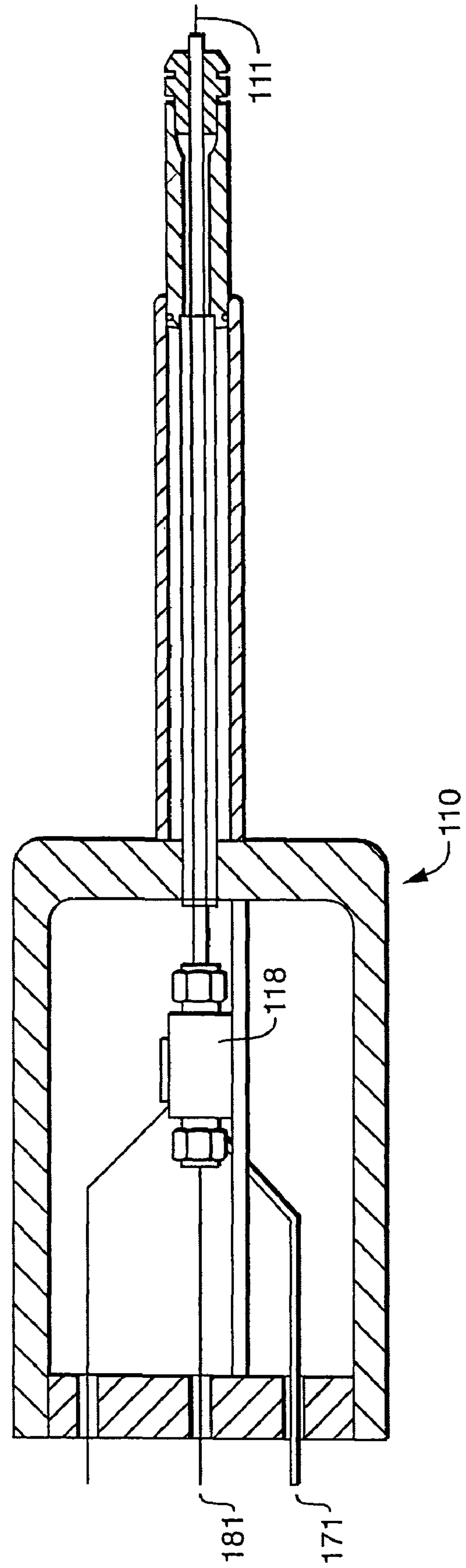
FIG. 3 depicts an electrospray ionization probe.

Electrospray ionization generates ions directly from solution by creating a fine spray of highly charged droplets in the presence of a strong electric field. The electrospray probe assembly 110, shown in detail in FIG. 3, comprises an electrically conductive capillary tube 111, which forms a nozzle at the exit end. The capillary tube 111 is positioned adjacent to and outside of the entrance port 19 of the chamber 160. During ESI mode, the capillary tube 111 is maintained at a potential of about 3.5 kV relative to the chamber 160 by the switch, such that the power supply 130 applies an electrical potential to the tube 111. A solution containing a sample to be ionized is pumped from the source 180 through the capillary tube 111 into an atmospheric pressure bath gas, so that an aerosol is generated adjacent to the entrance port 19 of the chamber 160. As the droplet decreases in size, the electric charge density on its surface increases. The mutual repulsion between like charges on this surface becomes so great that it exceeds the forces of surface tension, and ions begin to leave the droplet through what is known as a "Taylor cone". In particular, by virtue of electro hydrodynamic theory, the droplet evaporates to a point where the radius is 10μ and is liberated. The leftover droplets can undergo further desolvation to allow APCI to proceed. The ions are then electrostatically, directed through the chamber 160 and into the mass analyzer. The electrospray probe assembly 110 can generate positive or negative ions by reversing the potential applied to the tube 111 via the switch 150.

A supply of nebulizing gas, such as nitrogen, is fed via a nebulizing channel 171 from the nebulization source (170 in FIG. 1) to a T connector 118, which connects the capillary tube 111 to the nebulizing channel. The nebulizing gas emerges from the tube and facilitates further breakup of the liquid sample emerging from the capillary tube 111 and formation of gas phase ionic species the electrostatic nebulization of the solution. According to the present invention, the nebulizing gas is delivered at ambient temperature and is not required to be heated in order to effect ionization.

The probe assembly, is clamped adjacent to the entrance port 19 of the chamber 160, such that the resulting ions pass through the entrance port 19, through the chamber 160 and into the mass analyzer.

In APCI mode, ionization occurs through a corona discharge or plasma, creating reagent tons from the sample vapor. In APCI mode, the switch 150 activates the corona discharge, needle 120 and as a consequence of the gas and heat dynamics of the source chamber/enclosure and ESI probe, the droplets are further desolvated thereby producing gaseous phase molecules at ambient temperature. The power supply-establishes a corona discharge between the corona discharge needle 120 and the chamber 160 to effect ionization. Vaporized sample molecules from the probe 110 are carried through the corona discharge, creating reagent ions from the solvent vapor, which are conveyed through the chamber 160 to the mass analyzer.

Figure 4:
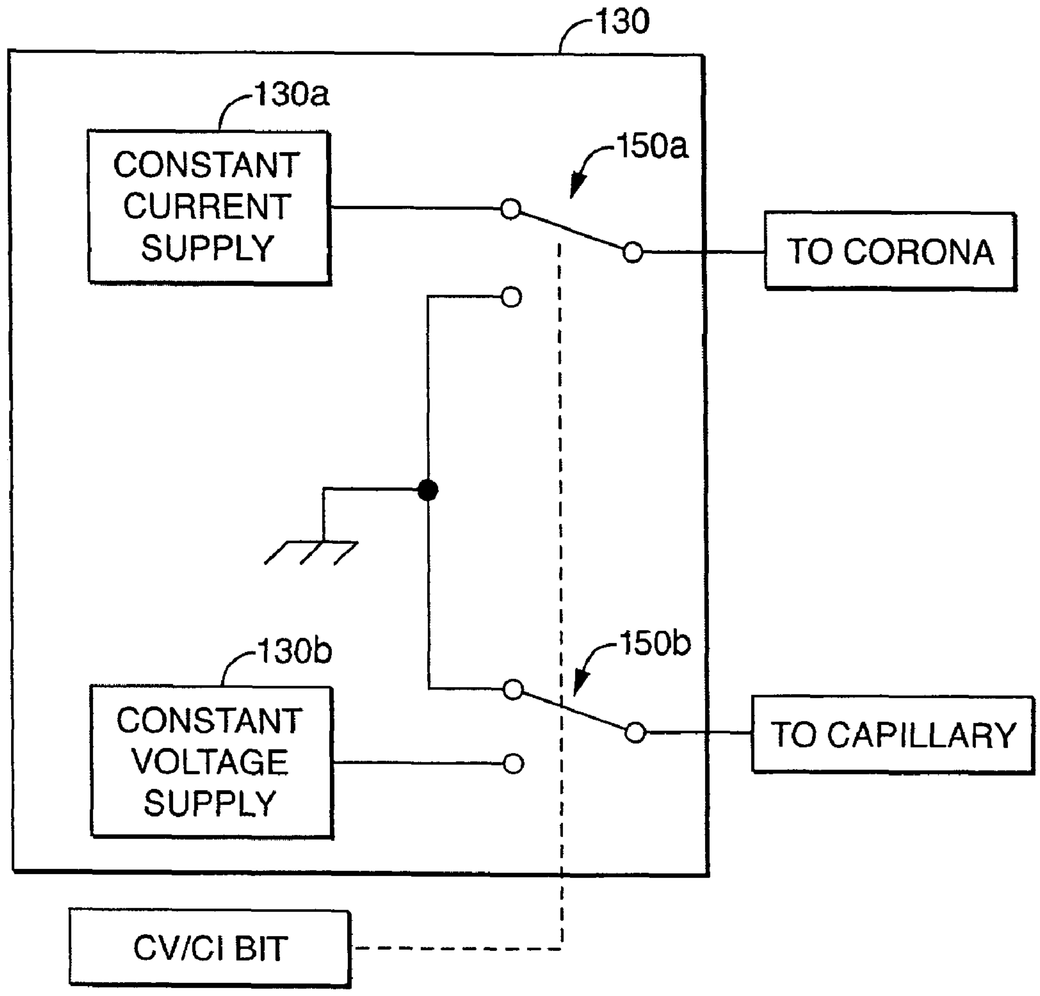
FIG. 4 depicts a schematic diagram of switching the capillary/corona pin HV outputs. A power supply has been designed using FET switches to allow solid-state changes to occur reproducibly and without damage to electronics.

FIG. 4 is a schematic view of the switch 150 according to an illustrative embodiment of the invention for enabling rapid switching between ionization modes. The switch 150 comprises a solid state switch, such as a field effect transistor (FET) switch for regulating current or voltage flow to the ESI probe and the corona discharge needle without damaging the electronics and without using any moving parts. The power supply 130 includes a constant current supply 130*a* for selectively applying a constant current to the corona and a constant voltage supply 130*b* for selectively applying a constant voltage to the capillary tube 111. A first switch 150*a* selectively connects the constant current supply 130*a* to the corona and a second switch 150*b* selectively connects the constant voltage supply 130*b* to the capillary 111. A V/I bit signal controls and changes the ionization mode by selectively applying a voltage or current to the switch. A scan-in-progress bit signal effects changes between positive and negative voltage to enable creation of positive or negative ions. The switch 150 is capable of switching ionization modes in less than one second and preferably in about 100 milliseconds or less.

Figure 5:
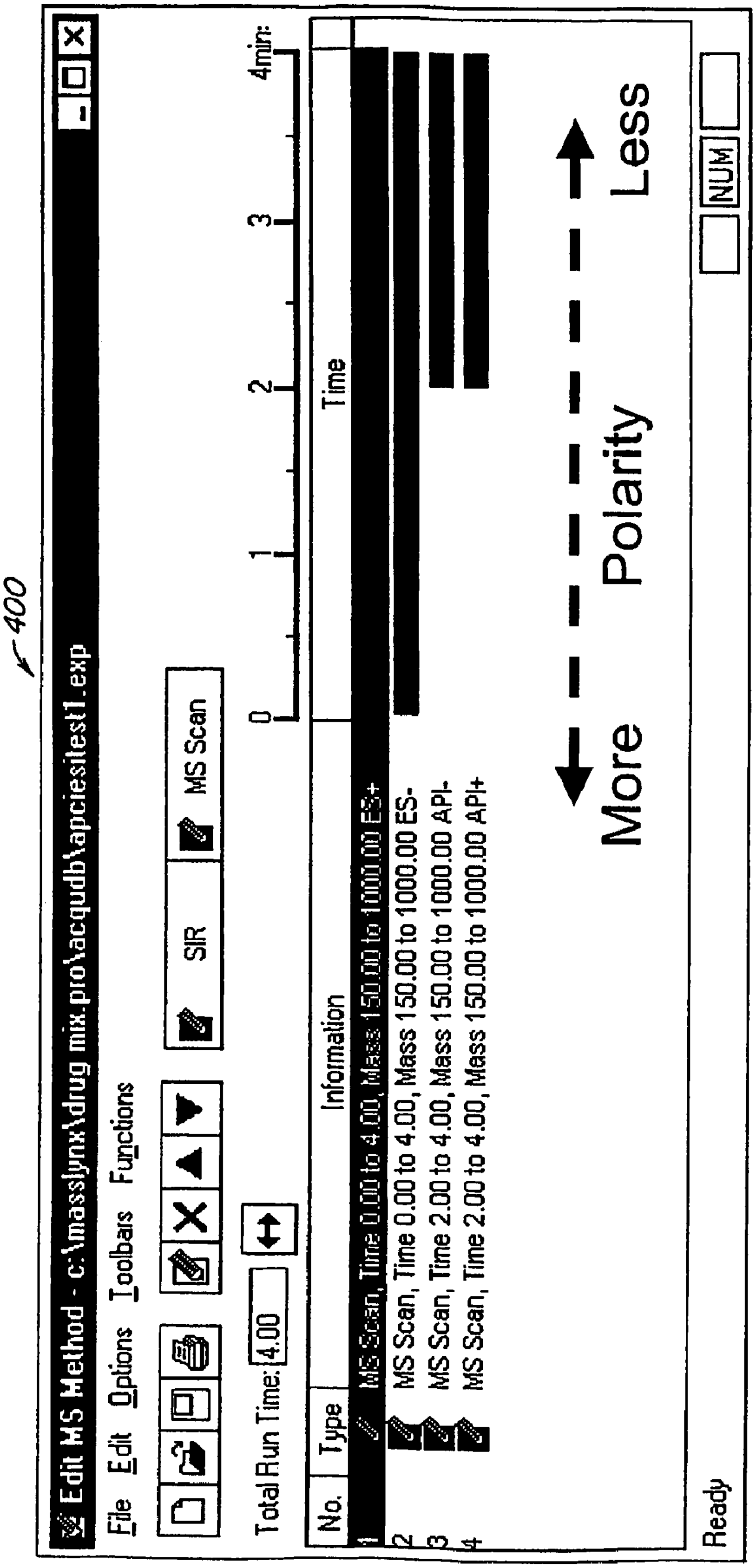
FIGS. 5 and 6 illustrate the graphical user interfaces suitable for controlling the ionization process and analysis according to an embodiment of the invention.
Figure 6:
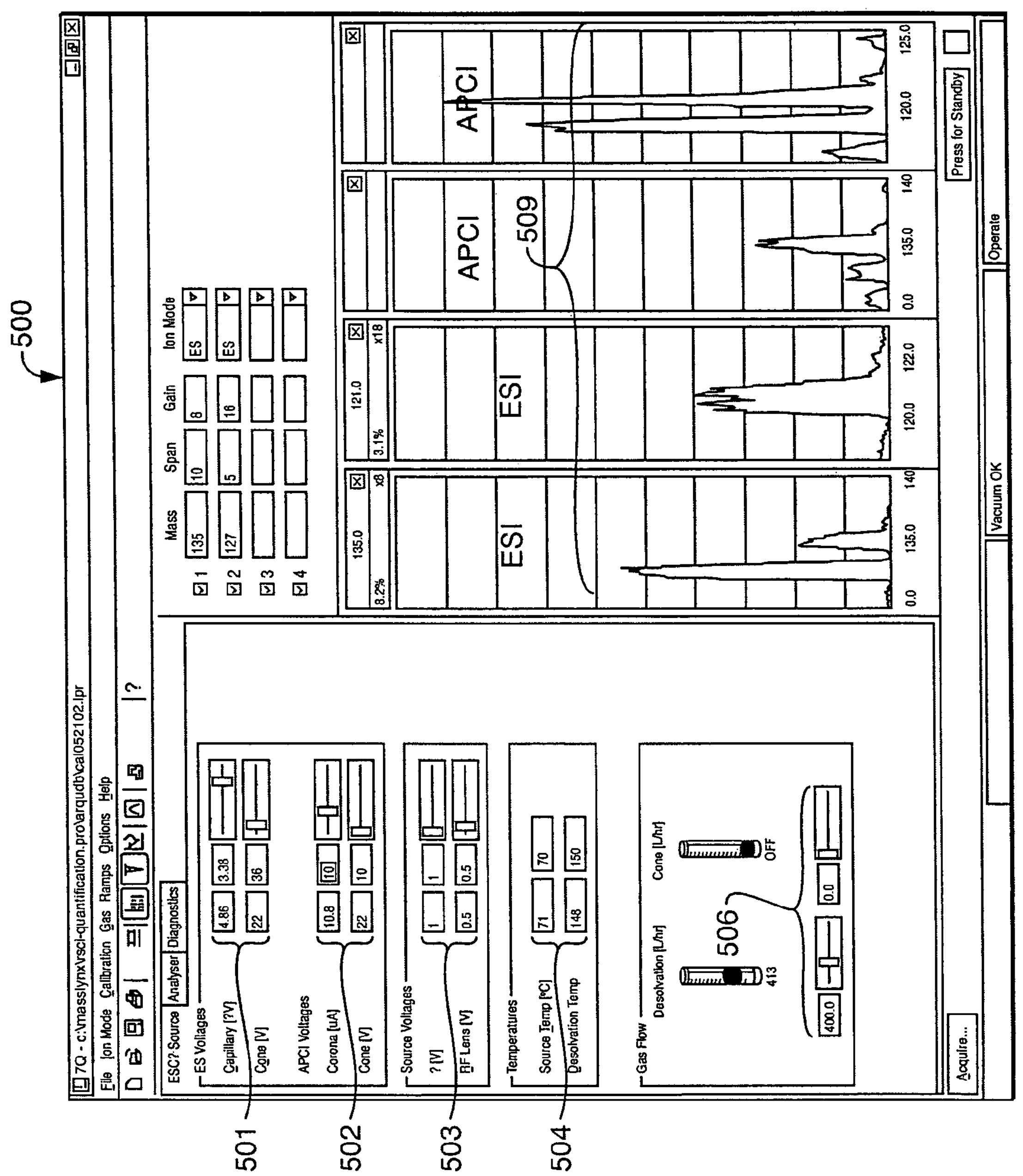

In yet a further embodiment, the process of ionizing a sample using the multi-mode source of the present invention is automatically controlled by the MassLynx™ system or other suitable software system. FIGS. 5 and 6 illustrate graphical user interfaces (GUIs) 400 and 500, respectively, suitable for controlling the ionization process and analysis according to an embodiment of the invention. A user enters selected parameters into the GUIs, which execute a pro gram stored in memory to control the ionization process. The software allows the operator to view and optimize the lenses and other active surface (temperature and gases) to optimize both ESI and APCI in the presence of the other analytes and chemistries present in the sample. Referring to FIG. 5, a user can enter selected parameters for the scan method in the interface 400, such as mode, e.g., positive electrospray, negative electrospray, positive APCI and negative APCI, duration and total run time. The system automatically controls the switch and other elements to operate according to the selected parameters. Referring to FIG. 6, another interface 500 may be used to optimize operating parameters separately for both APCI and ESI. For example, in a first field 501, the user can enter the optimal voltage on the capillary tube 111 and the hollow conical member 12 for ESI mode, in kilovolts and volts, respectively. In a second field 502, the user can enter the optimal current for the corona 120 and the optimal voltage for the hollow conical member 12. In field 503, the user can enter optimal voltages for the extractor and the radio frequency (RF) lens. In a fourth field 504, the user can enter an optimal temperature for the source and an optimal desolvation temperature. In field 506, the user can enter gas flow rates for desolvation and for the hollow conical member 12, in Liters per hour. During an analysis, the system automatically operates at the selected parameters entered by the user for each mode. In field 507, the interface displays the results of the analysis.

In one preferred embodiment, the source enclosure measures 53 inches by volume and the present shape and contour contribute to the dynamics. (See FIGS. 2A-2C). Also, the present invention's source enclosure provides ionization of the sample at lower temperatures, between about 60 to 75° C., including between about 60 to 70° C., e.g., 60 to 70° C. Furthermore, in a preferred embodiment of the present inventions, the source should be constructed of a metal, more preferably aluminum.

The multi-mode ionization source provides significant advantages over prior ionization sources and techniques. The multi-mode ionization source enables automatic, rapid switching from a first ionization mode to a second ionization mode without compromising results and without requiring modification of the equipment. High-speed switching is provided by the use of a solid-state switching device. Moreover, multi-mode ionization allows the unique opportunity to acquire valuable data during short time constant events such as chromatographic peak transitions. Furthermore, because there is no need to elevate the temperature of the nebulizing gas to effect ionization, the source is capable of rapid switching between techniques without waiting for heating to occur. The multi-mode ionization source allows for optimal techniques and conditions to be applied to a sample during a single run. Thus, the multi-mode ionization source realizes significant savings in cost and time while increasing efficiency.

EXEMPLIFICATION

Example 1

While there are many compounds that are ionized by both ESI and APCI, they may not ionize with equal success. Furthermore, some compounds may not ionize by ESI at all. The present invention provides a solution for ionization of compounds of this nature.

Figure 7:
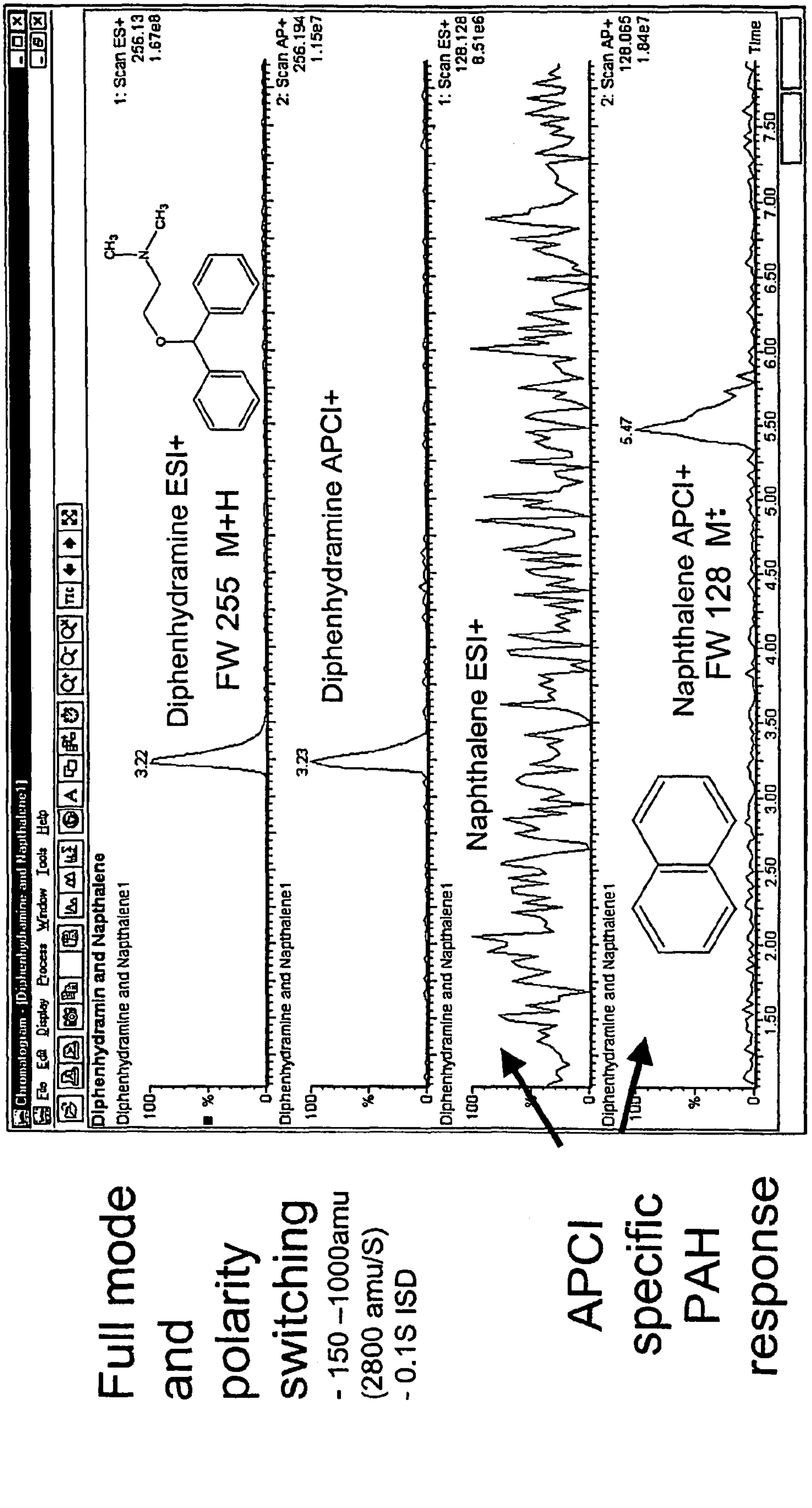
FIG. 7 shows results of an electrospray mass spectra of polycyclic aromatic hydrocarbons (PAHs) differentiated between APCI and ESI performance.

For example, the performance of the ZQ™ Mass Spectrometer with an ESCi™ ionization source has yielded successful results of polycyclic aromatic hydrocarbons (PAHs). PAHs such as naphthalene do not ionize by ESI because there is no opportunity for a proton to attach to form M+H. FIG. 7 shows the results of ionized diphenhydramine and naphthalene at full mode and polarity switching, −150-1000 amu (2800 amu/S)-0.1 S ISD. The results of the ESCi clearly captured the result of compounds which may not be ionized by ESI. ESCi provides a choice through conventional methods to alternatives ESI−, ESI+, APCI− and APCI+ modes or to acquire in any one of the modes full time.

Example 2

Figure 8:
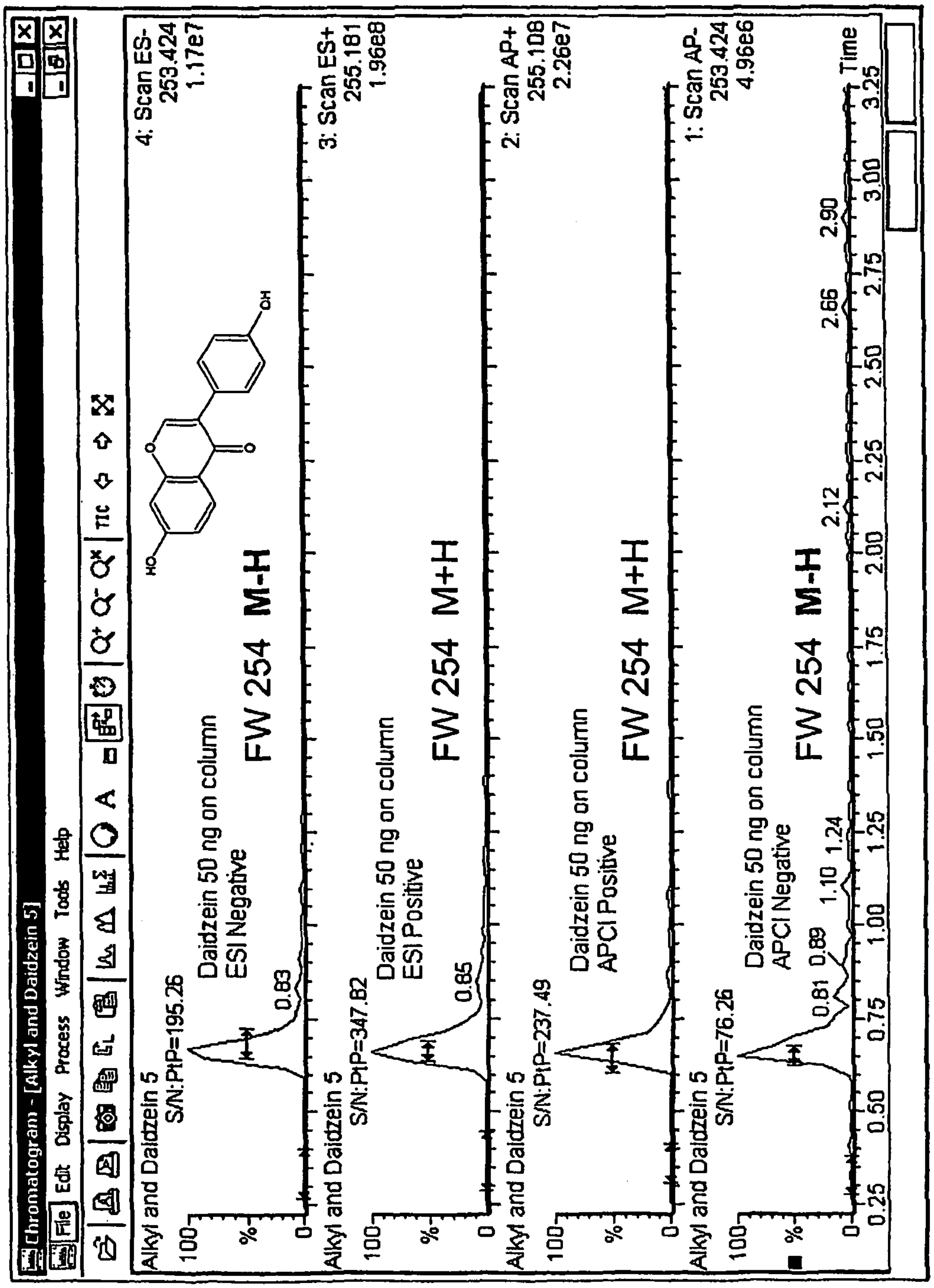
FIG. 8 illustrates results demonstrates a response is shown by a single injection of 50 ng of the isofavonoid daidzein yielding very high s/n in four modes at 100 μ/s.

Further demonstrating the capacity and diversity of the present invention was the results of sampling 50 ng daidzein isolavornoid on-column. This example showed the accuracy and fidelity of the results of all four modes. While the practice of sample preheating is common during electrospray, this example illustrates that ESCi proceeds exceptionally well with inordinate amounts of heat introduced. In fact, this example illustrates that the heat settings were identical to normal ESI operation. The ESI desolvation temperatures were near 120° C., as opposed to the 400-600° C. range needed by standard MS configurations. FIG. 8 demonstrates a good response by 50 ng of the isofavonoid daidzein yielded a very high s/n.

Example 3

Figure 9:
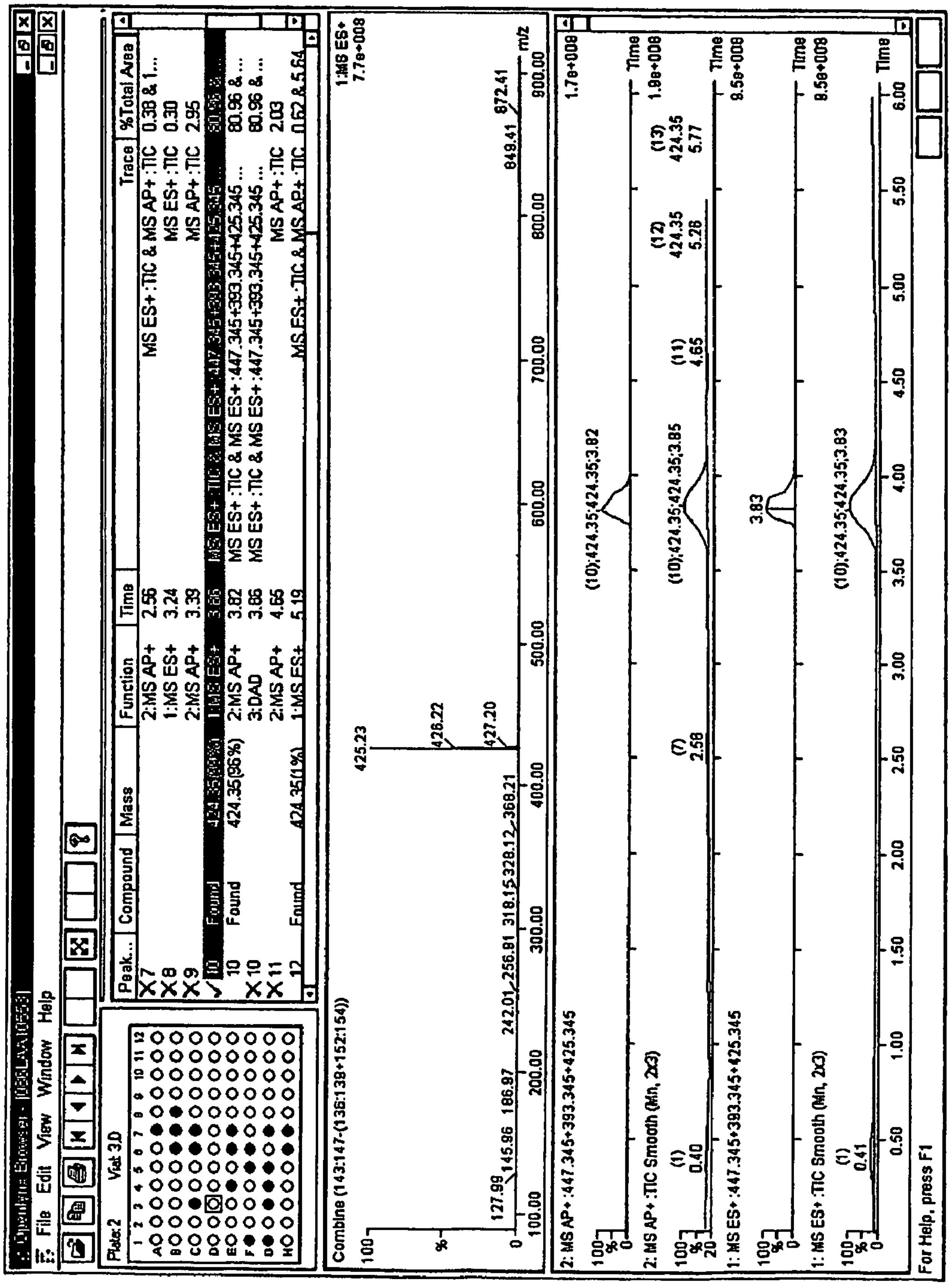
FIG. 9 depicts a collection of output for a MassLynx™ data showing simultaneous collection of data in multiple modes.
Figure 10:
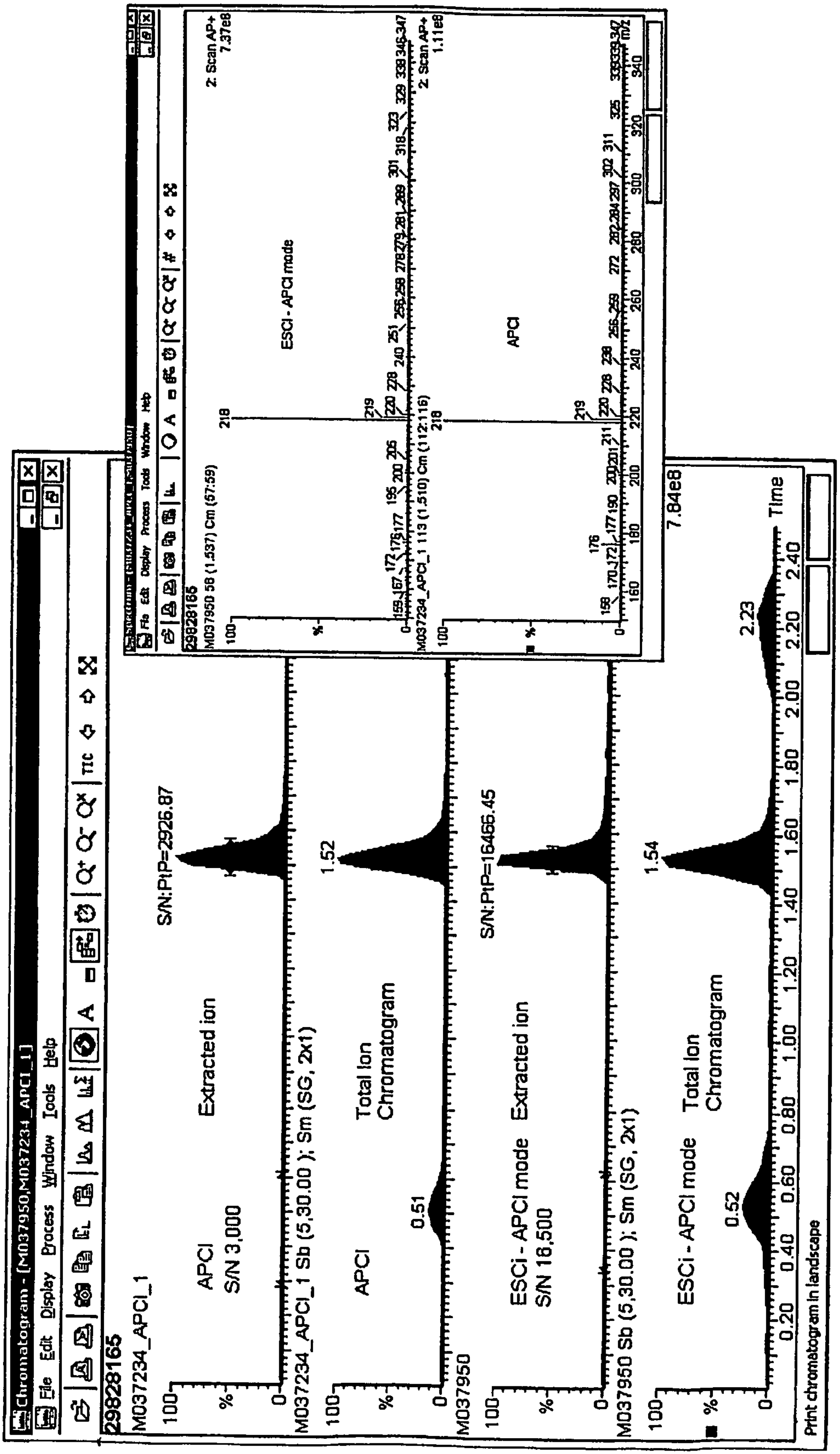
FIGS. 10-13, represent that the present invention creates a high quality, fast and accurate sample library as compared with traditional ESI and APCI alone.
Figure 11:
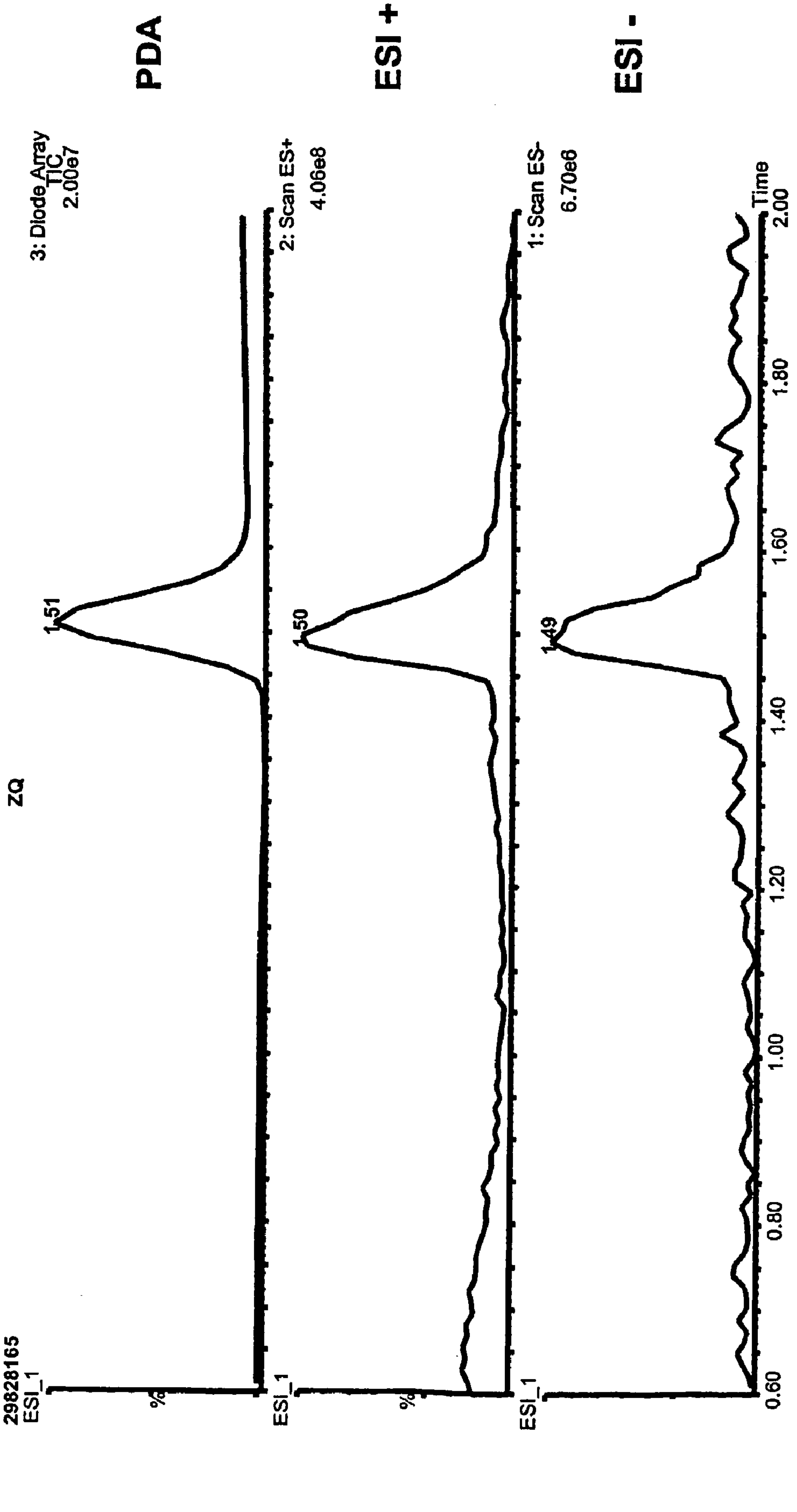
Figure 12:
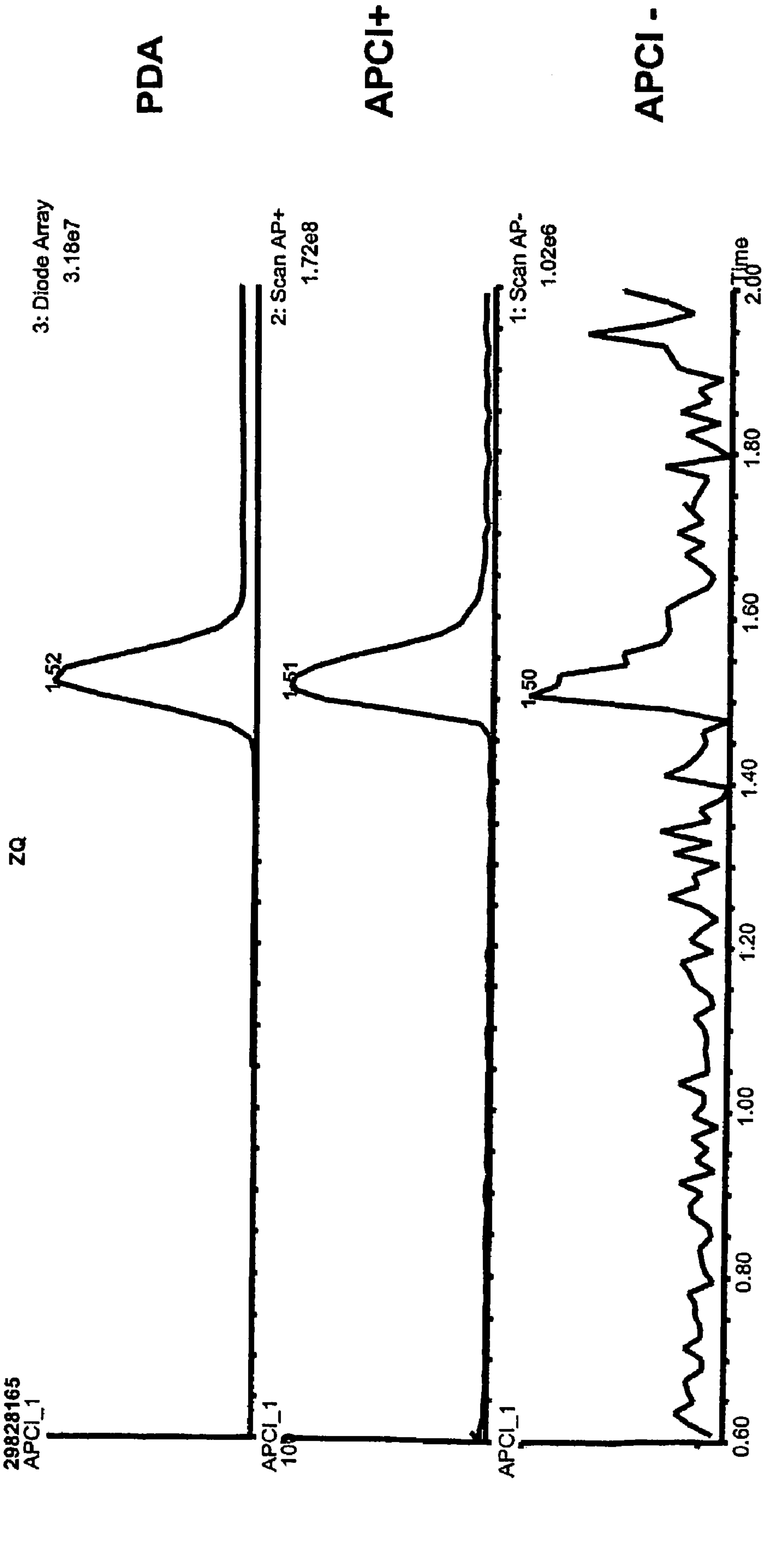

This example demonstrated that the ESCi new technology may be adapted easily to current operating systems such as the GSK (RTP) Open Access. Here, output was a valid MassLynx™ data file which allowed the ESCi technology to be added transparently to open access and high throughput environments. Previously, these environments had to be operated in one mode or another using different devices. This allowed the collection of data and results as well as an invaluable ability to compare both modes. (See FIG. 9).

Example 4

One of the most important applications of the present invention is the ability to use the results to create accurate sample libraries. This example set out to characterize 500,000 compounds in one year ensuring a purity level of >70%. The results are used to label a correct molecular weight as determined from the result of positive and/or negative mass spectra.

The experimental detail was run on a short LC gradient. There was a generic 2 minute gradient (0.05% formic Acid/MeCN), with 3 minute run time. The flow rate was 0.7 ml/min with injected volume of 1 ul. The compounds were detected at a UV of 225-320 did and the mass spectra was run at 150-800 amu. The scans were taken at 00.2 sec (3250 amu/sec) with a 0.2 sec. ISD (inter scan delay).

This example further illustrated that with a slower flow rate, the acquisitions times were actually increased due to the lack of high heat necessary for the ESCi to perform. Thus, the very high acquisitions rate capability of the embedded PC on the ZQ allowed more functions to be carried out during the brief passage of the chromatographic peak or band by scanning at speeds far above what was normal prior to the instant invention.

The present example proceeded by taking a 96-well test plate containing a variety of compounds covering molecular weight from 150-500 amu. These compounds were analyzed in three phases; (a) traditional ESI source alone, (2) traditional APCI source alone and by (3) reanalyzed using ESCi™ technology.

Figure 13:
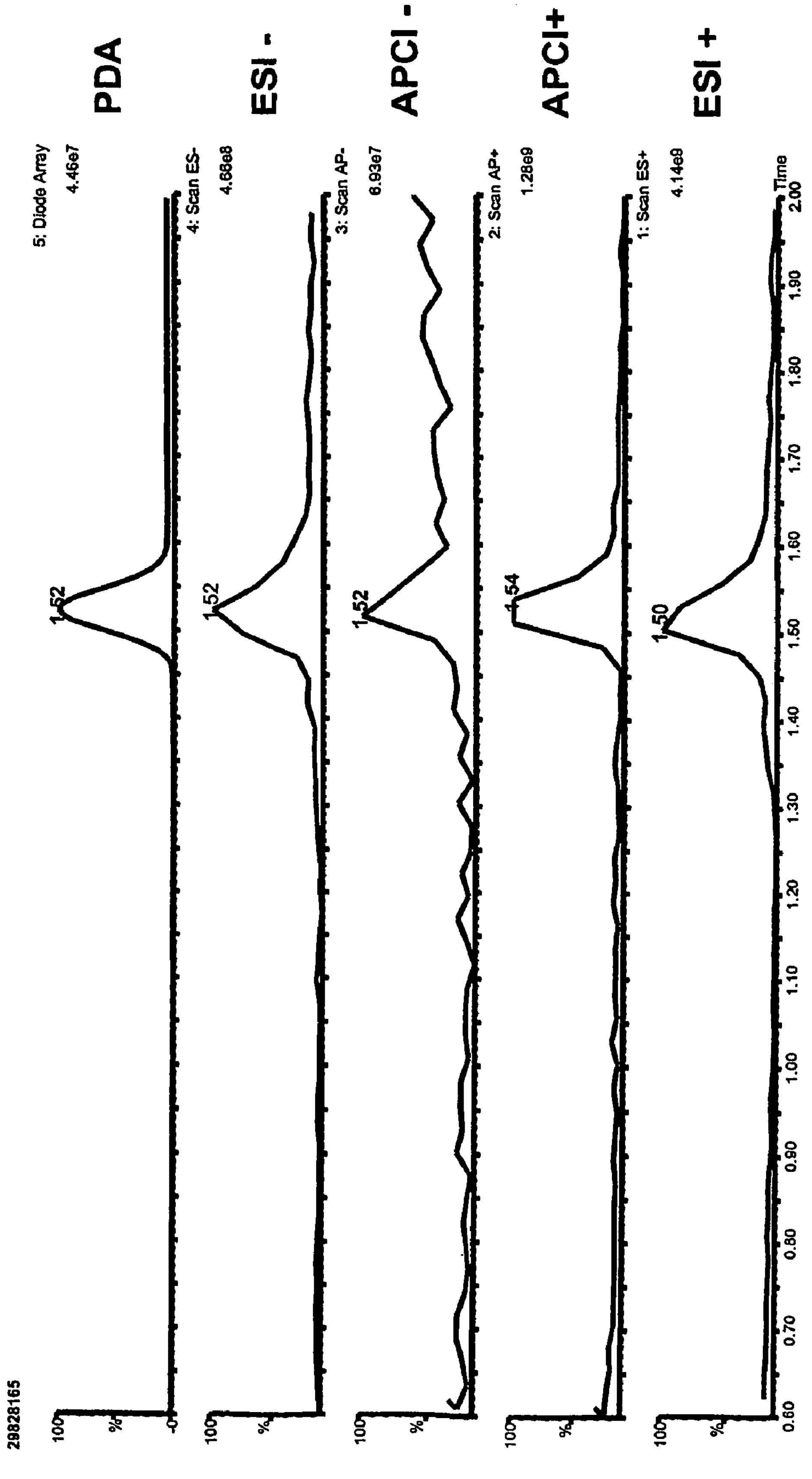

The results showed the advantages and improvement of results for the sample libraries via the ESCi method versus other traditional modes of analysis. In FIGS. 10-13, the present invention created a high quality, fast and accurate sample library as compared with traditional ESI and APCI alone. It was clear that the spectra were well matched throughout the various modes. Furthermore, this experiment showed that sensitivity under certain conditions was improved in ESCi over APCI experiments. This experiment was directed more at achieving adequate sensitively and very high utility. FIG. 13 shows the ESCi TIC comparison indicates similar response under these operating conditions.

Figure 14:
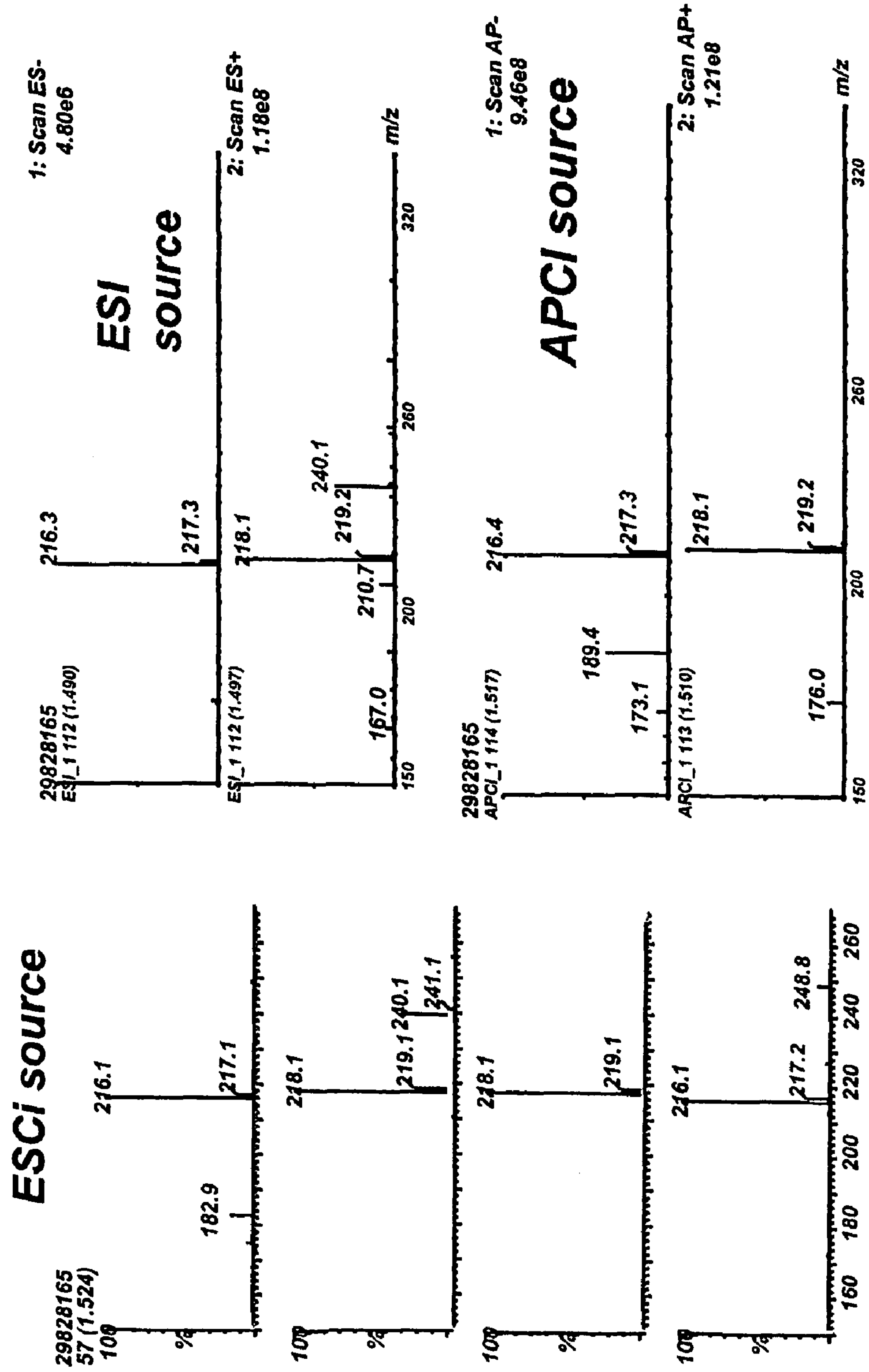
FIG. 14 depicts data from a multi-mode run to compare ESI vs. APCI vs. ESCi for all the spectra for APCI and ESI match well with the ESCi derived versions.

FIG. 14 illustrates the data results of ESI vs. APCI vs. ESCi for all the spectra. This data highlighted the success and accuracy of data acquisition by the ESCi method by comparing the APCI and ESI results with the ESCi derived results.

Example 5

Figure 15:
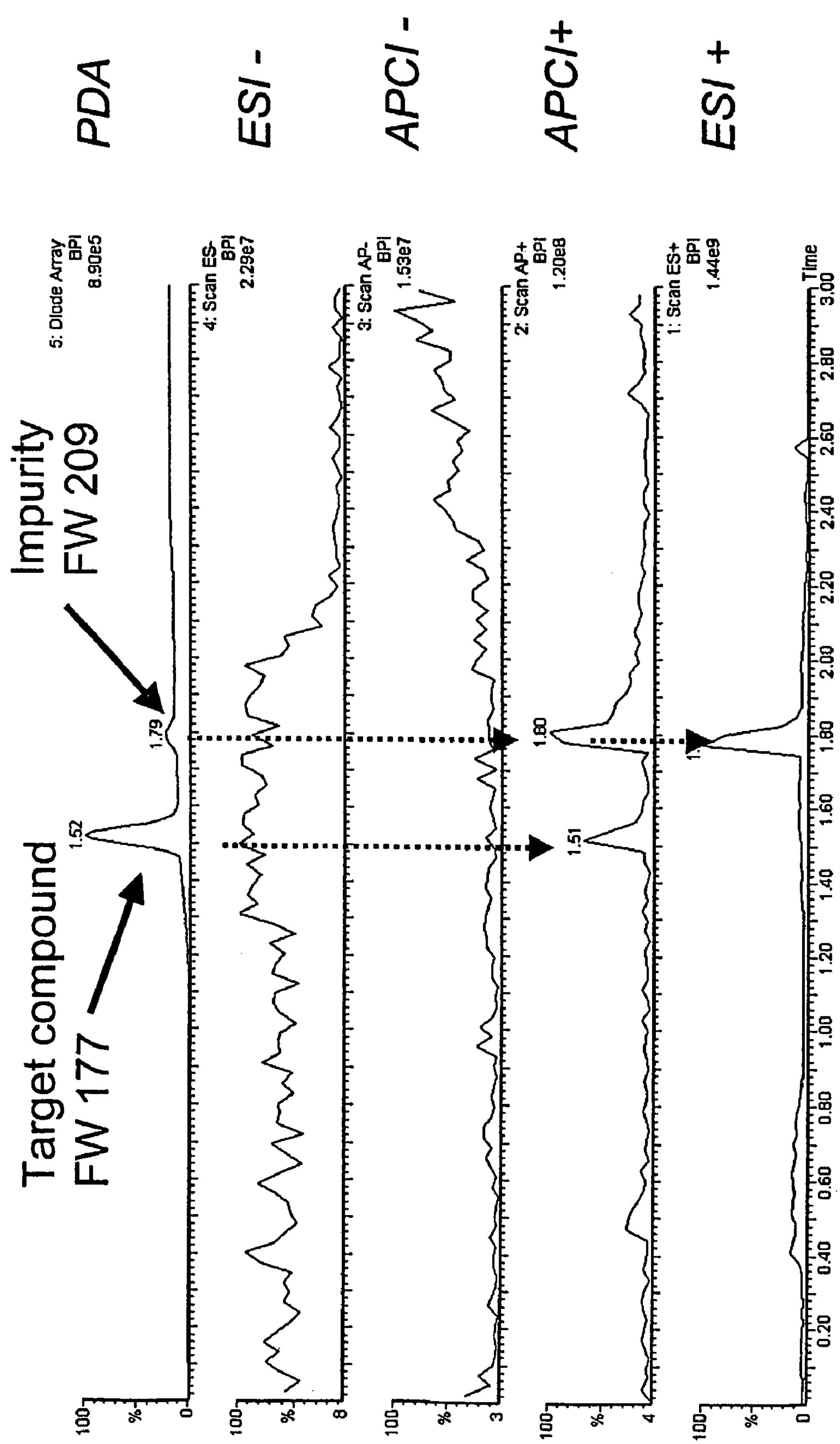
FIG. 15 depicts the comparison of all modes showing a target compound and an impurity which appears in results. The illustration shows the advantage of the present invention over a single source ionization mode.

Another advantage of the present invention is that a single injection captures multiple data points. As illustrated in FIG. 15, the chromatogram demonstrated that target and an impurity in the PDA trace. ESI− and APCI− failed to respond, but interestingly, the APCI+ trace showed the target and impurity while the ESI+ trace, which is often the only trace in most laboratories, showed only the impurity. This experiment illustrated the advantageous ability to collect accurate compound results.

Example 6

There also has been experimentation with this method and extending the ionization mode capability beyond ESI and APCI to include other forms of ionization such as photoionization detector (APPI). APPI will promote ionization of weekly polar or neutral analytes, monomers, hydrocarbons or organo-heteroatom species and other compounds which to not "spray" readily. This device used ultraviolet light as a means of ionizing an analyte exiting from a gas chromatography (GC) column. Electrodes collected the ions produced by this process. The current generated was therefore a measure of the analyte concentration.

Example 7

Figure 16:
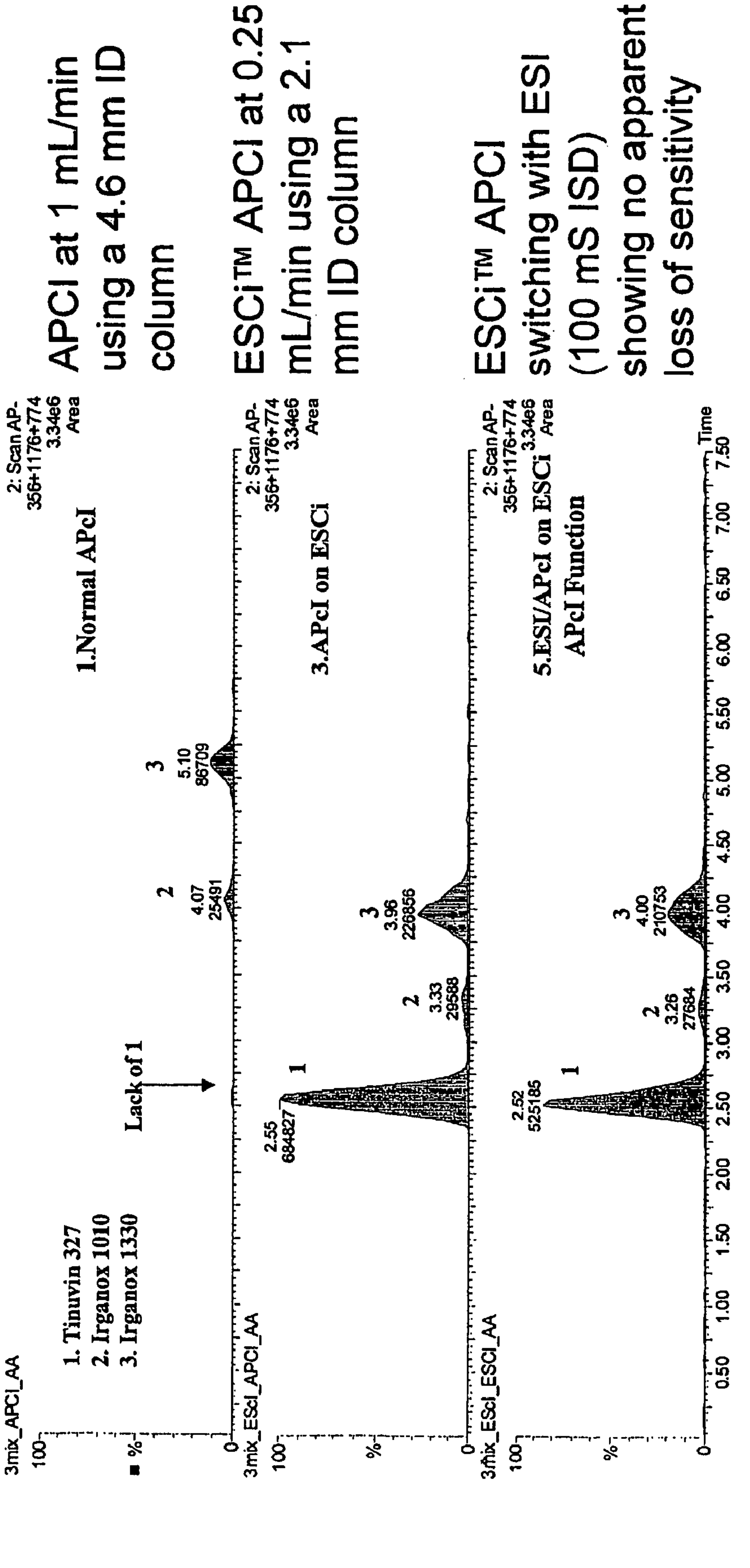
FIG. 16 depicts data from a run to compare APCI vs. ESCi™ vs. ESCi APCI for a 3 mix polymer additive of (1) Tinuvin 327, (2) Irganox 1010, and (3) Irganox 1330.

Further advantages of the ESCi™ multimode-ionization are illustrated by the comparison of polymer additives. As illustrated in FIG. 16, switching between the APCI and ESI at 100 mS ISD, showed no apparent loss of sensitivity. The data points demonstrated between APCI at 1 mL/min using 4.6 mm ID column, ESCi™ at 0.25 mL/min using a 2.1 mm ID column and the ESCi™ APCI switching with ESI at 100 mS ISD demonstrated that target compounds could be detect with no apparent floss of sensitivity. This experiment illustrated the advantageous ability to collect accurate compound results with speed and high fidelity. (See FIG. 16).

In sum, the advantages of the invention are that the ESCi apparatus used existing mass spectrometers. The addition of the apparatus discharge mechanism and power supply has proven successful in experimental runs. The ESCi Source ran at 100 ms inter scan delay for polarity and ionization switches. There is no apparent loss of performance for both ESI and APCI under these experimental conditions. The present invention reduced annalist times and was incorporated into open access instruments.

EQUIVALENTS

Those skilled in the art will recognize, or be able to ascertain using no more than routine experimentation, many equivalents to the specific embodiments of the invention described herein. Such equivalents are intended to be encompassed by the following claims.

The entire contents of all references, patents, and patent applications cited herein are expressly incorporated by reference.

I claim:

1. An ionization source for a mass spectrometer that allows different ionization techniques to be applied to a sample within a single analysis, the ionization source comprising source chamber in communication with an ion path;

an electrospray probe enclosed in the source chamber for ionizing a sample to create an at least partially ionized stream;

a non-electrospray device enclosed in the source chamber for ionizing the at least partially ionized stream; and a power supply for selectively applying an electrical potential to the electrospray probe and the non-electrospray device, the power supply having a solid state switch for directing the electrical potential from the power supply to one or both of the electrospray probe and the non-electrospray device.

2. The ionization source of claim 1, wherein a housing defines the source chamber that defines an enclosure shape and contour that contribute to the ionization dynamics.

3. The ionization source of claim 1, wherein the source chamber is constructed to allow ionization of the sample at a temperature between about 60 to 70° C.

4. The ionization source of claim 1, wherein the solid state switch comprises a field effect transistor.

5. The ionization source of claim 1, wherein the second device is selected from the group consisting of a photoionization device, a corona discharge needle for ionizing a sample using atmospheric pressure chemical ionization and an electrospray probe.

6. A method of ionizing a sample for analysis by a mass spectrometer, comprising:

introducing a sample to a probe;

ionizing the sample using a first ionization mode;

switching to a second ionization mode;

ionizing the sample using a second ionization mode, wherein the step of switching has a duration of less than one second.

7. A method of claim 6, wherein the sample is analyzed to form a library of compounds.

8. A method of claim 6, wherein the second ionization mode is photoionization.

9. A system for ionizing a sample using a multi-mode ionization source using a computer, comprising:

a multi-mode ionization source for ionizing a sample using a plurality of ionization modes; and an interface for displaying information related to the multi-mode ionization source.

10. A sample method of claim 9, wherein the sample is analyzed to form a library of compounds.

11. A multimode ionization source for a mass spectrometer, comprising:

a housing having a chamber for containing a plurality of ions and defining an exit port in communication with the mass spectrometer;

an electrospray probe mounted in the chamber for introducing a sample into the chamber and selectively ionizing the sample;

a corona discharge needle mounted in the chamber for selectively ionizing the sample;

a power supply for providing an electrical potential; and a solid state switch for directing the electrical potential from the power supply to the electrospray probe and corona discharge needle, wherein the solid state switch can cycle between the electrospray probe and corona discharge needle at a frequency of more than once per second to produce a mass spectra of the sample having features of electrospray ionization and corona discharge ionization.

12. A multimode ionization source as recited in claim 11, further comprising a nebulizing source for delivering a nebulizing gas to the electrospray probe.

13. A multimode ionization source for a mass spectrometer that applies different ionization techniques to a sample within a single analysis, the ionization source comprising:

a housing defining a source chamber in communication with a sample path, the housing having a size and shape that distributes and retains heat about the source chamber;

an electrospray probe enclosed in the source chamber for ionizing a sample to create an ionized stream, wherein the housing enhances desolvation of the ionized stream so that atmospheric pressure chemical ionization (APCI) can occur efficiently; and an APCI needle enclosed in the source chamber for ionizing the desolvated ionized stream.

14. A multimode ionization source as recited in claim 13, further comprising block heaters for heating the source chamber and a heater for heating the electrospray probe.

15. A multimode ionization source as recited in claim 13, wherein the housing has a large mass of a material with favorable heat retention and distribution qualities.

16. A multimode ionization source as recited in claim 13, wherein the housing allows ionization of the sample at a temperature between about 60 to 70° C.

17. A multimode ionization source as recited in claim 13, wherein the housing has a size and shape that distributes and retains heat about the sample path.

* * * * *